(12) United States Patent
Malcolm

(10) Patent No.: US 8,719,539 B2
(45) Date of Patent: *May 6, 2014

(54) USING HEURISTICS FOR FIELD TYPES OF A STRUCTURE TO CATEGORIZE DYNAMIC MEMORY ALLOCATIONS

(75) Inventor: David Hugh Malcolm, Somerville, MA (US)

(73) Assignee: Red Hat, Inc., Raleigh, NC (US)

( * ) Notice: Subject to any disclaimer, the term of this patent is extended or adjusted under 35 U.S.C. 154(b) by 306 days.

This patent is subject to a terminal disclaimer.

(21) Appl. No.: 13/174,651

(22) Filed: Jun. 30, 2011

(65) Prior Publication Data

US 2013/0007404 A1   Jan. 3, 2013

(51) Int. Cl.
*G06F 12/00* (2006.01)

(52) U.S. Cl.
USPC .................... 711/170; 711/151; 711/E12.002

(58) Field of Classification Search
None
See application file for complete search history.

(56) References Cited

U.S. PATENT DOCUMENTS

| | | | | |
|---|---|---|---|---|
| 4,933,936 A * | 6/1990 | Rasmussen et al. | .......... | 370/406 |
| 5,410,701 A * | 4/1995 | Gopalraman | ................ | 717/142 |
| 5,437,025 A * | 7/1995 | Bale et al. | .................... | 707/103 |
| 5,465,365 A * | 11/1995 | Winterbottom | .............. | 707/101 |
| 5,511,199 A * | 4/1996 | Anthias et al. | ................ | 719/315 |
| 5,623,666 A * | 4/1997 | Pike et al. | ......................... | 707/2 |
| 5,956,512 A * | 9/1999 | Simmons et al. | ............. | 717/128 |
| 6,434,742 B1 * | 8/2002 | Koepele, Jr. | .................. | 717/140 |
| 6,467,075 B1 * | 10/2002 | Sato et al. | .................... | 716/103 |
| 6,510,352 B1 * | 1/2003 | Badavas et al. | ................. | 700/19 |
| 6,546,553 B1 * | 4/2003 | Hunt | ............................. | 717/174 |
| 6,801,229 B1 * | 10/2004 | Tinkler | ......................... | 715/853 |
| 7,292,531 B1 | 11/2007 | Hill | | |
| 7,659,894 B2 * | 2/2010 | Keller et al. | .................. | 345/426 |
| 8,463,971 B2 * | 6/2013 | Solomita et al. | ............. | 710/267 |
| 2002/0129336 A1 * | 9/2002 | Bolding et al. | ............... | 717/124 |
| 2003/0142764 A1 * | 7/2003 | Keevill et al. | ................. | 375/341 |
| 2003/0145281 A1 * | 7/2003 | Thames et al. | ................ | 715/513 |
| 2004/0054945 A1 * | 3/2004 | Smith | ............................. | 714/38 |
| 2004/0128661 A1 * | 7/2004 | Ghosh et al. | .................. | 717/159 |
| 2006/0047501 A1 * | 3/2006 | Seroussi et al. | ................... | 704/9 |
| 2006/0059468 A1 * | 3/2006 | Heirich | ......................... | 717/125 |
| 2006/0072649 A1 * | 4/2006 | Chang et al. | .................. | 375/132 |
| 2006/0080385 A1 * | 4/2006 | Blandford et al. | ............ | 709/203 |
| 2006/0212852 A1 * | 9/2006 | Hwang | ......................... | 717/127 |
| 2007/0067758 A1 * | 3/2007 | Findeisen et al. | ............. | 717/140 |
| 2007/0180192 A1 * | 8/2007 | Matsuda | ....................... | 711/118 |

(Continued)

OTHER PUBLICATIONS

Richard M. Stallman and Cygnus Support. "Debugging with GDB: The GNU Source-Level Debugger." Ed. 4.12. Jan. 1994.*

(Continued)

*Primary Examiner* — Matthew Bradley
*Assistant Examiner* — Daniel Bernard
(74) *Attorney, Agent, or Firm* — Lowenstein Sandler LLP

(57) ABSTRACT

A programming and debugging system determines a block of dynamically allocated memory in an inferior process memory space corresponds to a structure and casts the block of memory as an instance of the structure. The programming and debugging system determines a field type of a field in the instance of the structure and determines whether memory data pertaining to the block of dynamically allocated memory satisfies one or more criteria in heuristics data associated with the field type. The programming and debugging system categorizes the block of dynamically allocated memory based on the determination of whether the memory data satisfies the one or more criteria of the field type.

20 Claims, 8 Drawing Sheets

(56) References Cited

U.S. PATENT DOCUMENTS

| | | | | |
|---|---|---|---|---|
| 2007/0204259 | A1* | 8/2007 | Wilner et al. | 717/124 |
| 2007/0234294 | A1* | 10/2007 | Gooding | 717/124 |
| 2007/0240124 | A1* | 10/2007 | Taneda et al. | 717/129 |
| 2008/0071748 | A1* | 3/2008 | Wroblewski et al. | 707/3 |
| 2008/0270996 | A1* | 10/2008 | Choi et al. | 717/129 |
| 2008/0273616 | A1* | 11/2008 | Papasakellariou | 375/260 |
| 2008/0288919 | A1* | 11/2008 | Hodges et al. | 717/106 |
| 2009/0024819 | A1* | 1/2009 | Fisher et al. | 711/170 |
| 2010/0153460 | A1* | 6/2010 | Baisley | 707/802 |
| 2010/0153475 | A1* | 6/2010 | Zedlitz et al. | 707/814 |
| 2010/0180179 | A1 | 7/2010 | Lastras-Montano | |
| 2010/0257054 | A1* | 10/2010 | Martin et al. | 705/14.46 |
| 2010/0287536 | A1* | 11/2010 | Chung et al. | 717/128 |
| 2010/0287538 | A1* | 11/2010 | Soundararajan et al. | 717/128 |
| 2011/0252180 | A1* | 10/2011 | Hendry et al. | 711/3 |
| 2011/0283163 | A1* | 11/2011 | Zheng | 714/763 |
| 2012/0063413 | A1* | 3/2012 | Kroener et al. | 370/330 |
| 2012/0216076 | A1* | 8/2012 | Macik et al. | 714/38.1 |

OTHER PUBLICATIONS

Graeme S. Roy, "mpatrol, A Library for Controlling and Tracing Dynamic Memory Allocations," Edition 2.17 for mpatrol version 1.5.1, Dec. 19, 2008, 258 pages.

CCMALLOC, as downloaded on Jun. 30, 2011 from http://cs.ecs.baylor.edu/~donahoo/tools/ccmalloc/, 1 page.

Armin Biere, "USAGE," V 1.3, Dec. 4, 2001 as downloaded on Jun. 30, 2011 from http://cs.ecs.baylor.edu/~donahoo/tools/ccmalloc/USAGE, 1 page.

Sanjay Ghemawat, Google Heap Profiler, modified on May 7, 2010, as downloaded on Jun. 30, 2011 from http://google-perftools.googlecode.com/svn/trunk/doc/heapprofile.html , 3 pages.

Mario Hewardt, "Advanced .NET Debugging: Managed Head and Garbage Collection," Nov. 18, 2009, 50 pages.

Klaus Salchner, "SOS from Your Production Environment," Apr. 11, 2005, 12 pages.

SOS.dll (SOS Debugging Extension), as downloaded on Jun. 30, 2011 from http://msdn.microsoft.com/en-us/library/bb190764.aspx, 10 pages.

Karim Yaghmour, Building Embedded Linux Systems, Chapter 11, Section 11.4 Memory Debugging, as downloaded on Jun. 30, 2011 from http://www.eduunix.ccut.edu.cn/index/html/linux/O'Reilly%20-%20Building%20Embedded%20Linux%20Systems/belinuxsys-CHP-11-SECT-4.html, 7 pages.

USPTO Office Action for U.S. Appl. No. 13/174,646 mailed Jun. 17, 2013.

USPTO Office Action for U.S. Appl. No. 13/174,636 mailed May 13, 2013.

Microsoft Corp., "How to use the IIS Debug Diagnosis tool to troubleshoot a memory leak in an IIS process," Microsoft Help and Support, US, Rev. 3.0, Sep. 22, 2006, retrieved Oct. 27, 2006. <http://support.microsoft.com/kb/919790>, 3 pages.

* cited by examiner

USING HEURISTICS FOR FIELD TYPES OF A STRUCTURE TO CATEGORIZE DYNAMIC MEMORY ALLOCATIONS

RELATED APPLICATION

The present application is related to co-filed U.S. patent application Ser. No. 13/174,636 entitled "Debugging a Dynamic Memory Allocation Using Heuristics Reliability Scores" and U.S. patent application Ser. No. 13/174,646 entitled "Using Symbol Information for Categorization of Dynamic Memory Allocations", which are assigned to the assignee of the present application.

TECHNICAL FIELD

Embodiments of the present invention relate to debugging memory. Specifically, the embodiments of the present invention relate to categorizing dynamic memory allocations using heuristics for field types of a structure.

BACKGROUND

Dynamic memory allocation is the allocation of memory (e.g., random access memory (RAM)) for use in a user program during the run-time of that program. Memory is typically allocated from a large pool of an unused memory area, known in the art as the heap. A user, such as a software programmer, a software developer, and a system administrator, can execute a program and may notice that the program is running at a speed slower than expected and/or that the program is using significantly more dynamically allocated memory than expected. The user may wish to debug how the heap is being used by the program and to help identify how the performance of a program can be optimized.

Conventional solutions for debugging dynamic memory allocations may use heuristics to categorize memory at a very high-level and generally do not furnish results that provide any value to a user. Traditional solutions do not deduce information to categorize how a program uses the dynamically allocated memory in great detail.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention are directed to a method and system for categorizing dynamically allocated areas of memory by an inferior process using heuristics data for a program. A programming and debugging system determines a block of dynamically allocated memory in an inferior process memory space corresponds to a structure and casts the block of memory as an instance of the structure. The programming and debugging system determines a field type of a field in the instance of the structure and determines whether memory data pertaining to the block of dynamically allocated memory satisfies one or more criteria in heuristics data associated with the field type. The programming and debugging system categorizes the block of dynamically allocated memory based on the determination of whether the memory data satisfies the one or more criteria.

Embodiments of the present invention categorize blocks of dynamically allocated memory at a level of detail to provide users, such as a software programmer, with valuable data to optimize the performance of a program. Embodiments provide a level of detail by applying heuristics that pertain to the field types of fields in a structure.

Figure 1:
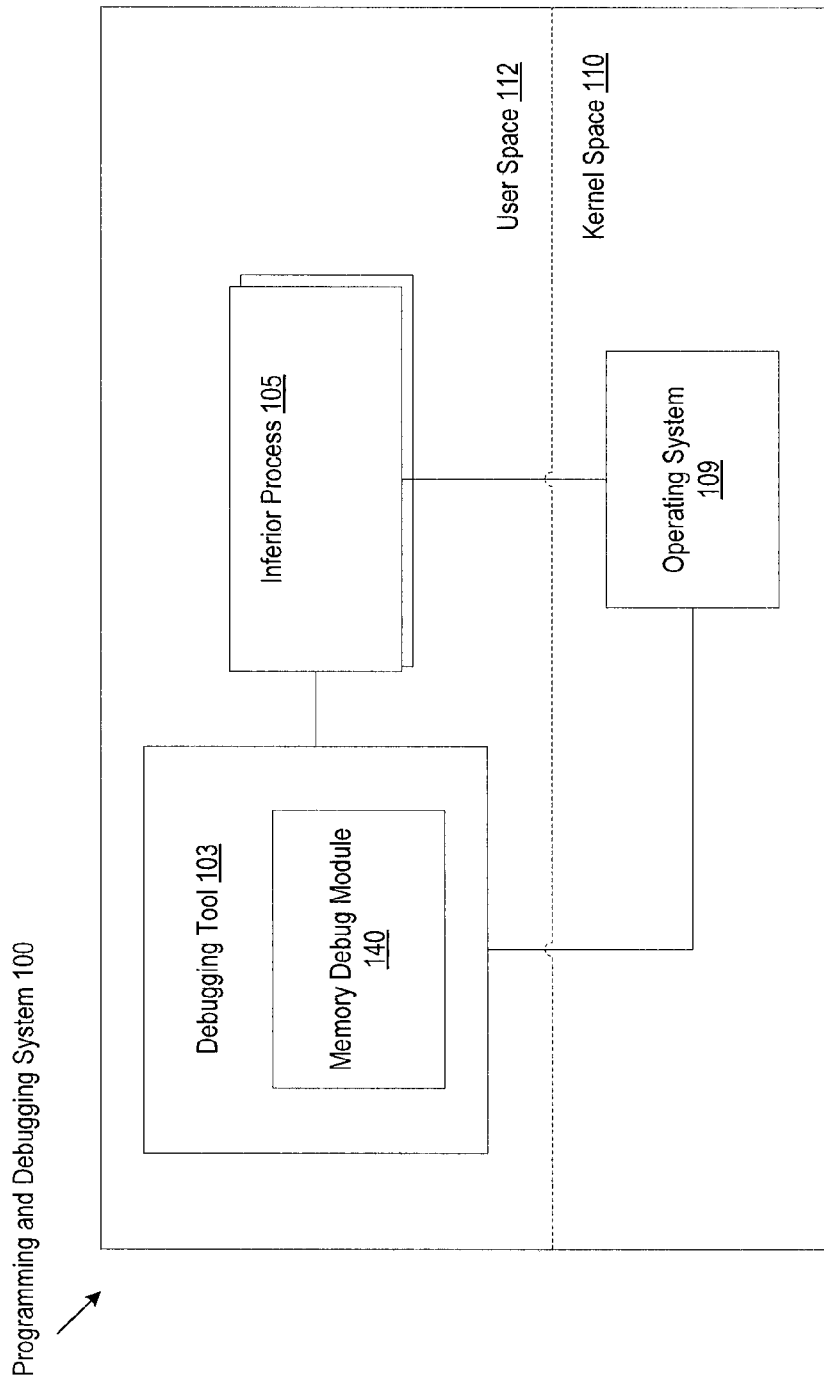
FIG. 1 illustrates an exemplary programming and debugging environment in which embodiments of the present invention may operate.

FIG. 1 illustrates an exemplary programming and debugging system 100 debugging a dynamic memory allocation using heuristics for field types of a structure in accordance with some embodiments of the invention. The programming and debugging system 100 can be hosted by a computer system (e.g., a server, client, workstations, desktop, tablet, one or more small protable platforms, such as a notebook, a PDA (personal digital assistant), or wireless web devices, and other devices. An exemplary computer system is described in greater detail below in conjunction with FIG. 8.

System 100 includes memory that can be divided into regions, such as user space 112 and kernel space 110. The kernel space 110 is reserved for running an operating system 109 (e.g., Linux® OS, Windows® OS, etc.). The user space 112 is reserved for running user mode programs including program processes 105. A program is a set of instructions that can be executed by one or more processors and a program process 105 is an instance of a program that is being executed, with a memory area for its own random-access storage. This is typically implemented using "virtual memory" by an operating system 109, and known as the "address space" of the process 105. A program process 105 is hereinafter referred to as an inferior process. A debugger process is able to take control of an inferior process 105, and, in particular, read the data stored in the memory area of the inferior process 105 into its own memory area.

A user, such as a software programmer, a software developer, a system administrator, can execute a program, which can include execution of one or more inferior processes 105, for example, by using a programming tool. Examples of a programming tool include tools for programming in Java, Perl, Python, Ada, C, C++, FreeBASIC, FreePascal, Fortran, etc. An operating system 109 can statically allocate memory for an inferior process 105 at compile time before the associated inferior process 105 is executed, and can dynamically allocate memory for use in an inferior process 105 during the runtime of that inferior process 105. The memory can be allocated from an area of memory, known in the art as the heap.

A memory debug module 140 can be an extension module running with a debugging tool 103. The programming and debugging system 100 hosts a debugging tool 103 in the user space 112 to allow a user to debug the dynamically allocated areas of memory within the inferior process 105. For example, an inferior process 105 may be running and a user may notice that the inferior process 105 is executing at a speed slower than expected and/or that the inferior process 105 is using significantly more dynamically allocated memory than expected. The user can execute the debugging tool 103 to categorize the dynamically allocated areas of memory within the inferior process 105 in detail and to help a user identify how the performance of a program executing the inferior process 105 can be optimized. An example of a debugging tool 103 is the GNU Debugger (GDB) for the GNU operating system. The kernel space 110 can include a kernel source level debugger (not shown), such as KGDB for the Linux® operating system, which allows for debugging of the host Linux® kernel through GDB.

The memory debug module 140 can use heuristics for field types of a structure to categorize the dynamically allocated areas of memory within an inferior process 105. The heuristics data can include one or more criteria for categorizing dynamically allocated memory and data that describes, for example, how a program object is implemented at the machine code level. The criteria can be implemented as code. In one embodiment, the criteria is implemented as bytecode.

An external debugger process can read in collections of bytes from the inferior process 105 and determine the best interpretation of each of the collections of bytes. Given a buffer of bytes from the inferior process 105 and a set of different possible interpretations, the memory debug module 140 can determine which of the interpretations are valid interpretations of the bytes. The memory debug module 140 can use heuristics for field types of a structure to determine which of the interpretations is the best interpretation and categorize the allocations of the bytes from the inferior process.

The debugging tool 103 can attach to the inferior process 105 and execute an external debugger process, which is a process that is separate from the inferior process 105 and has a debugger process memory space that is separate from the inferior process 105 memory space. Using an external debugger process that is separate from the inferior process 105 allows a user to debug the dynamic memory allocation without having to reconfigure a programming and debugging system 100 ahead of time.

Figure 2:
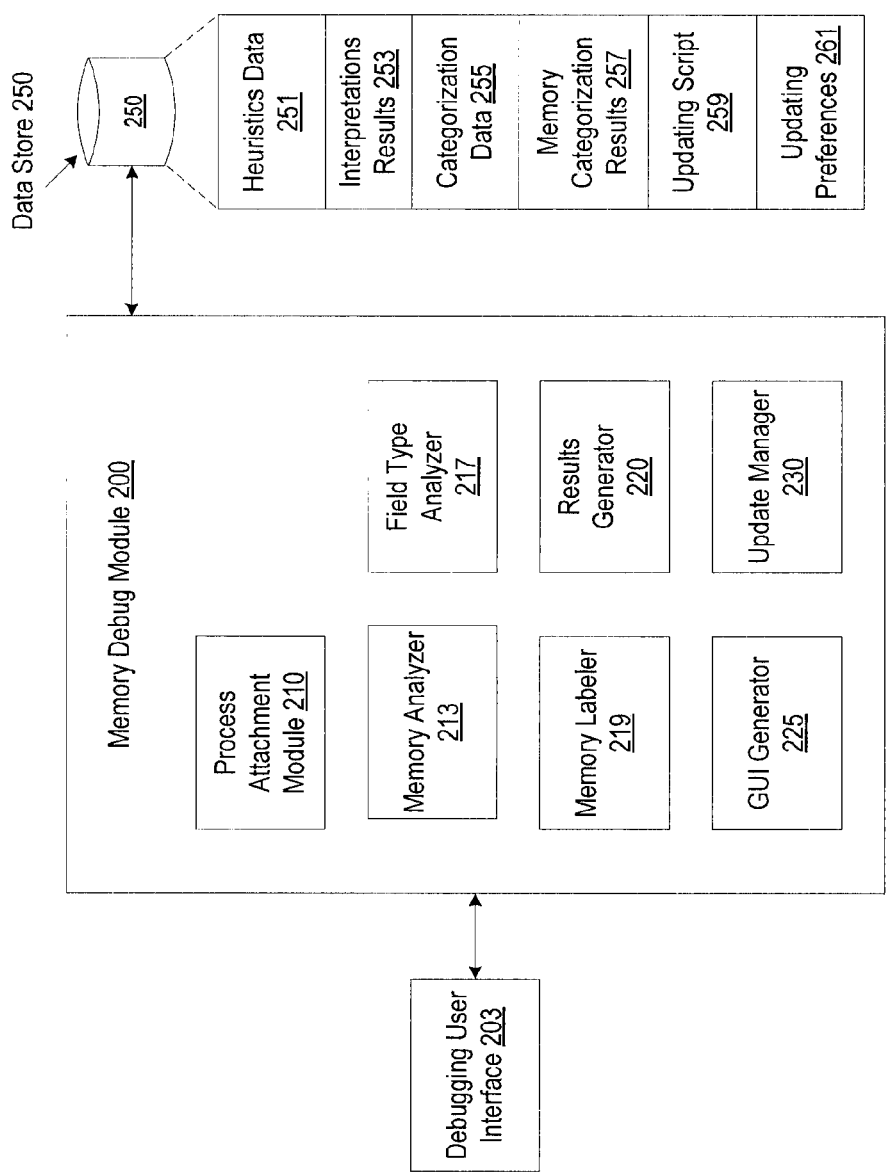
FIG. 2 is a block diagram of one embodiment of memory debug module for debugging a dynamic memory allocation using heuristics for field types of a structure.

FIG. 2 is a block diagram of one embodiment of a memory debug module 200 for debugging dynamic memory allocations using heuristics for field types of a structure. The memory debug module 200 may be the same as the memory debug module 140 in the system 100 of FIG. 1. The memory debug module 200 includes a process attachment module 210, a memory analyzer 213, a field type analyzer 217, a memory labeler 219, a results generator 220, a graphical user interface (GUI) generator 225, and an update manager 230.

In one embodiment, the memory labeling module 200 is coupled to a data store 250 that stores heuristics data 251. The heuristics data 251 can include one or more criteria for categorizing the dynamically allocated memory. Heuristics can be implemented as code or data within the debugger process which categorize the block of memory. For example, there are many different interpretations of what the ones and zeroes "mean." The memory debug module 200 is looking to find the best interpretation, taking a reasonable amount of time in which to do it. It is possible for a given heuristic to get the wrong answer, thus the memory debug module 200 is looking for heuristics that quickly give correct results on real world data, achieving an acceptable ratio of true results to false results, and of categorized blocks to uncategorized blocks.

Examples of heuristic data 251 can include are not limited to, heuristics criteria pertaining to the implementation details of various data types for a particular programming language, heuristics criteria pertaining to whether a block of dynamically allocated memory corresponds to a structure, heuristics criteria pertaining to the initial word of a block of dynamically allocated memory, heuristic data for field types of a structure. For example, the data store 250 can store heuristics data 251 for field types of a structure, such as criteria for determining whether a region of memory is a pointer to a structure and criteria for determining whether a region of memory is an integer value.

A user can execute a debugging tool, such as GDB (GNU Debugger), to debug dynamic memory allocations. The process attachment module 210 can identify a process identifier (process ID) of an inferior process and can use the process ID to attach the debugging tool to the inferior process, which invokes an external debugger process to debug the dynamically allocated memory that is within the inferior process memory space. The process ID may also be supplied directly by user input. For example, the user may run a program named "top" to see the most memory-consuming processes on the system, notice something he/she was not expecting, and identify the process ID from that program's textual output. An operating system can provide system calls which the process attachment module 210 can use to directly access the address space of the inferior process, and read and write bytes of memory in the address space of the inferior process.

The memory analyzer 213 can examine an inferior process to determine its programming language and can identify which heuristics data 251 corresponds to the program process. For example, the memory analyzer 213 can examine an inferior process, determine it is a Python program, and can identify heuristics data 251 that describes how Python implements objects are implemented at a machine code level. The memory analyzer 213 can also receive user input of a selection of which heuristics data 251 is to be used for the inferior process via a debugging user interface 203.

The memory analyzer 213 can iterate through the blocks of dynamically allocated memory (e.g., RAM) within the inferior process memory space that are of interest and determine whether a block of dynamically allocated memory corresponds to a structure and/or a pointer to a structure. The heuristics analyzer 213 can follow pointers in the subset of bytes to examine other blocks of memory. The memory analyzer 213 can cast the block of dynamically allocated memory as that structure and determine whether the fields "appear correct" and appropriately categorize the block of memory. A field can "appear correct" if the subset of bits within the region have credible values.

The field type analyzer 217 can determine whether the fields "appear correct" by fetching bytes of dynamically allocated memory from the inferior process, interpreting the bytes, for example, as a pointer to a structure and/or an integer, and determining whether the interpretation results 253 satisfies heuristic data 251 for field types of a structure. In one embodiment, when the interpretation results 253 for a block of memory does not satisfy the heuristics criteria 251, the memory analyzer 213 can assign the category 'uncategorized' or 'unknown' to the block of dynamically allocated memory. When the interpretation results 253 for a block of memory satisfies the heuristics criteria 251, the memory analyzer 213 can identify a category to assign to the block based on the suggested category in the heuristics data 251. The memory analyzer 213 can store categorization data 255 that indicates the category for a block of dynamically allocated memory in the data store 250. The categorization data 255 can be stored within the debugger process memory space. For example, the memory analyzer 213 may categorize a block of dynamically allocated memory as a pointer to a structure and store categorization data 255 that indicates the category of 'pointer' for the particular block of dynamically allocated memory. The categorization data 255 can also include the address of the dynamically allocated memory.

The results generator 220 can generate memory categorization results 257 based on the categorization data 255 for the dynamically allocated memory. Examples of memory categorization results 257 include backtraces, snapshots of the state of the program process dynamic memory, a history of the snapshots, data showing the differences between the states, data that identifies buffer overflow, etc. The results generator 220 can receive user input, via a debugging user interface 203 that is coupled to the memory debug module 200, that identifies which memory categorization results 257 to generate. The debugging user interface 203 can be a graphical user interface. The graphical user interface (GUI) generator 225 can generate a GUI displaying the memory categorization results 257 to a user via the debugging user interface 203. The memory categorization results 257 can be stored in the data store 250. The memory categorization results 257 can be stored within the debugger process memory space, unlike traditional solutions that store data, such as backtraces, within the program process memory space.

In one embodiment, the results generator 220 stores the memory categorization results 257 in a cache that is coupled to the memory debug module 200. The update manager 230 can run an updating script 259 that is stored in the data store 250 to detect when information changes within the inferior process that is attached to a debugging tool and update the memory categorization results 257 to reflect the changes. The update manager 230 can periodically run the updating script 259 based on user input (e.g., every minute until the debugging tool is detached from the program process). The user input can be received via the debugging user interface 203 and can be stored as update preferences 261 in the data store 250.

A data store 250 can be implemented on a main memory or other data storage device, such as disks, network storage, and virtual memory. A data store can be a persistent storage unit. A persistent storage unit can be a local storage unit or a remote storage unit. Persistent storage units can be a magnetic storage unit, optical storage unit, solid state storage unit or similar storage unit. Persistent storage units can be a monolithic device or a distributed set of devices. A 'set', as used herein, refers to any positive whole number of items.

Figure 3:
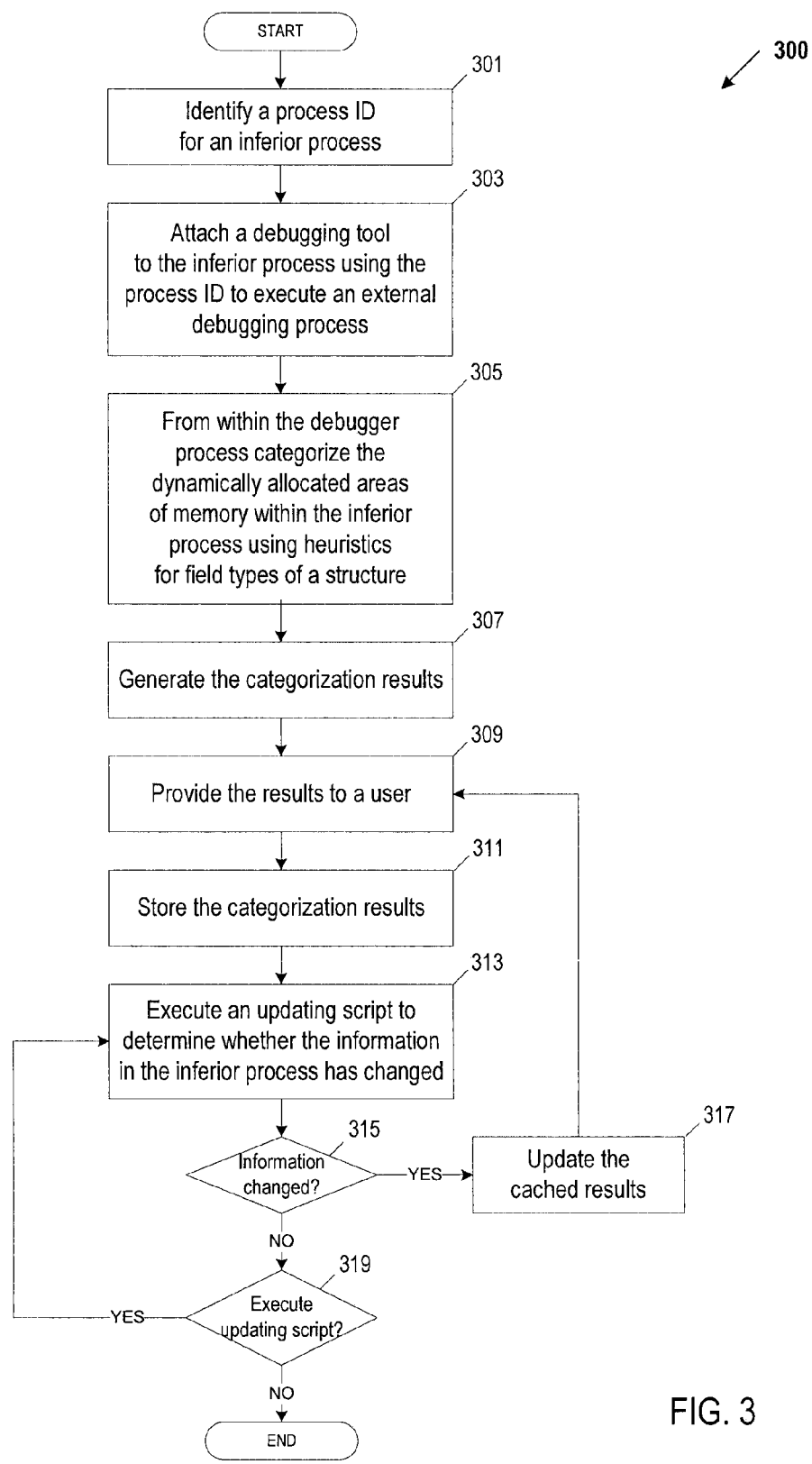
FIG. 3 is a flow diagram of an embodiment of a method for debugging a dynamic memory allocation using heuristics for field types of a structure.

FIG. 3 is a flow diagram of an embodiment of a method 300 for debugging a dynamic memory allocation using heuristics for field types of a structure. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by the memory debug module 140 in the programming and debugging system 100 of FIG. 1.

At block 301, the memory debug module identifies the process ID for the inferior process and uses it to attach the debugging tool to the inferior process at block 303. The memory debug module executes an external debugger process to debug the dynamically allocated areas of memory within the inferior process memory space. At block 305, the memory debug module, from within the external debugger process, categorizes blocks of dynamically allocated areas of memory within the inferior process using heuristics for field types of a structure. Embodiments of categorizing blocks of dynamically allocated areas of memory within the inferior process using heuristics for field types of a structure are described in greater detail below in conjunction with FIGS. 4-7.

At block 307, the memory debug module generates categorization results based on the categories that are assigned to the blocks of dynamically allocated memory. Examples of memory categorization results can include, and are not limited to, backtraces that provide data indicating why a dynamic memory allocation occurred, snapshots of the state of the program process dynamic memory, a history of the snapshots, data showing the differences between the states, data that identifies buffer-overflow, a history of iterations, etc. The memory debug module can receive user input identifying which memory categorization results to generate.

At block 309, the memory debug module provides the memory categorization results to the user. The memory categorization results can be provided to a user via an output device, such as a display device, printer, etc. The memory debug module can generate a GUI that includes the memory categorization results and display the GUI to show a user the categorization of the dynamically allocates areas of memory within the inferior process. In one embodiment, the memory debug module displays the GUI in parallel with the inferior process execution. In another embodiment, the memory debug module displays the GUI subsequent to the inferior process execution. One example of memory categorization results is provided as follows:

| Category | Count | Allocated Size |
|---|---|---|
| string data | 1,944 | 94,432 |
| python str | 85 | 52,752 |
| python dict | 164 | 47,600 |
| python type | 1 | 1,824 |
| python tuple | 3 | 1,232 |
| TOTAL | 2,197 | 197,840 |

The above example is an example of a category-by-category report on the dynamically allocated areas of memory within an inferior process. A user can use a category-by-category report to locate which aspects of an inferior process are occupying the bulk of memory, and which aspects of the inferior process may be the best targets for optimization work.

Another example of memory categorization results is provided as follows:

0x000000000060a1c0 -> 0x000000000060a28f    208 bytes    string data |2f 68 6f 6d 65 2f 64 61 76 69 64 2f 63 6f 64 69 6e 67 2f 68
65 61 70 3a 2f 75 73 72 2f 6c 69 62
|/home/david/coding/heap:/usr/lib|
0x000000000060a290 -> 0x000000000060ae9f    3088 bytes
uncategorized data |00 00 00 00 00 00 00 00 00 00 00 00 00 00 00 00
00 00 00 00 00 00 00 00 00 81 a8 ab 2f 15 0b b1 01
|............/..|

The example above is an example of a memory dump report in a hex dump form that shows all of the memory chunks. A memory dump report can provide a user additional clues into how memory is being used by a program process.

At block 311, the memory debug module stores the memory categorization results within the debugger process memory space, or on a backing store, such as disk (e.g. a SQLite database). Whereas, traditional memory debugging solutions store results, such as backtraces, within the memory space for the inferior process itself. In one embodiment, the memory debug module stores the memory categorization results in a cache memory and stores an updating script in a data store for updating the cached results. At block 313, the memory debug module runs an updating script to detect whether information within the inferior process that is attached to the debugging tool has changed. If the information has changed in the inferior process (block 315), the memory debug module updates the cached memory categorization results to reflect the change at block 317, and returns to block 309 to provide the updated results to a user.

At block 319, the memory debug module determines whether to execute the updating script again. The memory debug module can periodically execute the updating script based on user input. If the user input indicates that the updating script is to be executed, the memory debug module returns to block 313 to execute the updating script.

Figure 4:
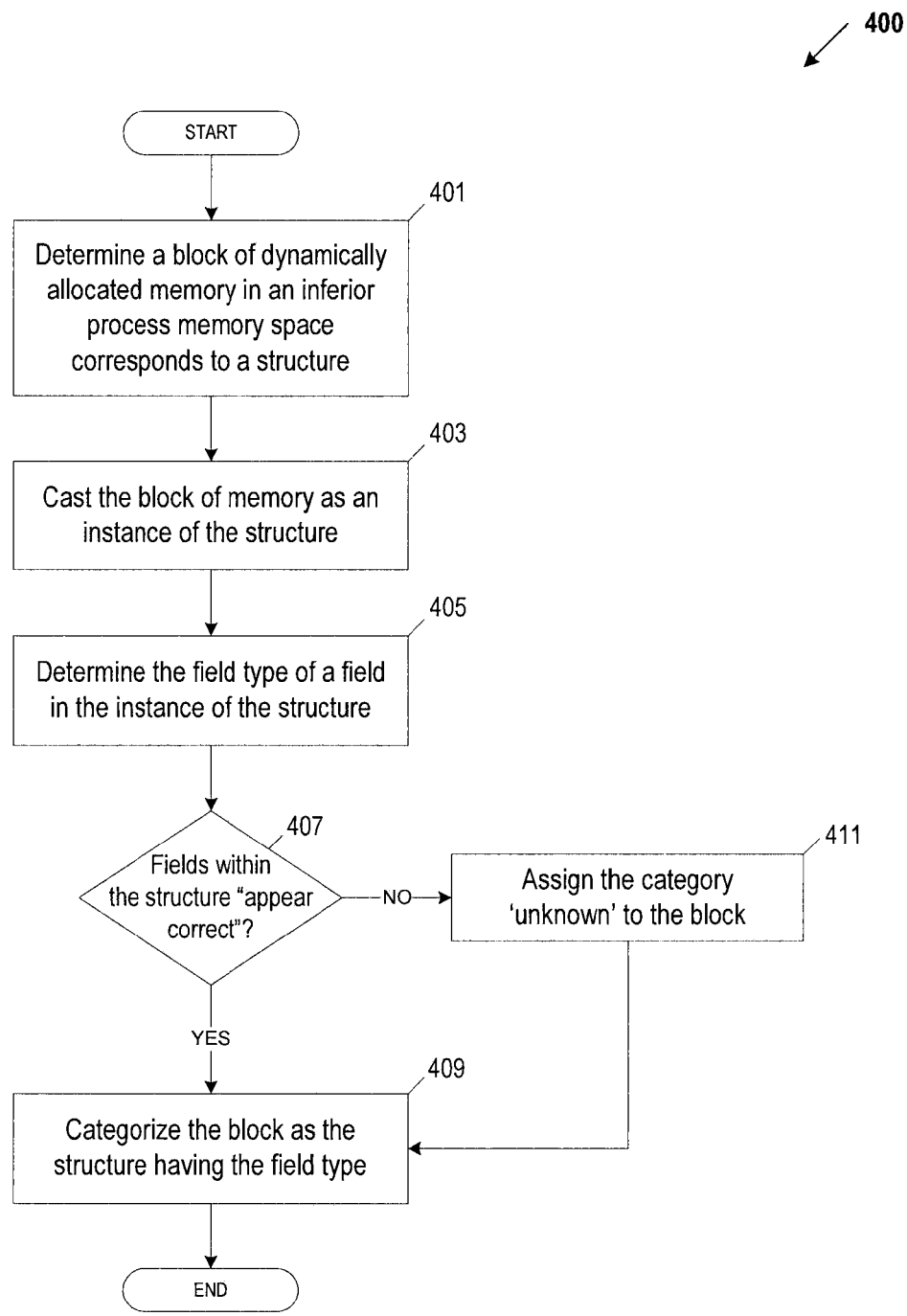
FIG. 4 is a flow diagram of an embodiment of a method for categorizing the dynamically allocated areas of memory using heuristics for field types of a structure.

FIG. 4 is a flow diagram of an embodiment of a method 400 for debugging a dynamic memory allocation using heuristics for field types of a structure. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by the memory debug module 140 in the programming and debugging system 100 of FIG. 1. In one embodiment, the method 400 starts with execution of a debugging tool to debug the dynamically allocated areas of memory within an inferior process.

At block 401, the memory debug module determines a block of dynamically allocated memory in an inferior process memory space corresponds to a structure. In one embodiment, the memory debug module determines the size of the block of dynamically allocated memory and examines the heuristics data to check if the size corresponds to a structure. In another embodiment, the memory debug module can determine the compound types known by a debugger tool and can cast the block as each compound type. One embodiment of a method for categorizing a block of dynamically allocated memory using compound types known by a debugger tool is described in greater details below in conjunction with FIG. 7.

In another embodiment, the memory debug module can test for a structure at a series of locations in the dynamically allocated memory relative to the start of the dynamically-allocated region, rather than just at one location. The memory debug module can test for a structure at a first location of an area of dynamically allocated memory. For example, the memory debug module can determine whether the block of memory at the first location satisfies the criteria in the heuristics data for a CPython object. If the criteria for a CPython object is not met, the memory debug module can test at least another location in the area of dynamically allocated area which is offset a number of bytes from the previous location. For example, many CPython objects begin at the start of an allocated block, but many CPython objects are padded with a header region, such as 12 bytes on a 32-bit build, for use by a garbage collector. A CPython object can begin 12 bytes inside the allocated region. The memory debug module can test for a structure, for example, at least twice, first testing to see if the beginning of a dynamically allocated region matches the criteria for being a CPython object. If that fails, the memory debug module can test again, offsetting the location of the tested blocks of memory by 12 bytes. In this example, the memory debug module can also examine a 12-byte header to check if additional heuristics criteria are satisfied.

At block 403, the memory debug module casts the block of dynamically allocated memory as an instance of the structure and determines the field type of a field in the instance of the structure at block 405. For example, the memory debug module casts the block of dynamically allocated memory at address 0x32781020 as being an instance of the database structure struct Foo. Casting the memory as an instance of the structure interprets the fields of the instance of the structure as values of the given types.

At block 407, the memory debug module applies heuristics criteria associated with the field type to determine whether the field within the structure "appears correct," such that the region of memory can be categorized as that particular field type. The heuristic data can include one or more criteria for determining whether a field "appears correct" based on the different types of fields, such as a pointer type and an integer type. One embodiment of a method of determining whether a field appears correct when interpreted at a pointer type is described in greater detail below in conjunction with FIG. 5. One embodiment of a method of determining whether a field appears correct when interpreted at an integer type is described in greater detail below in conjunction with FIG. 6. If the field within the structure "appears correct," the memory debug module categorizes the block of dynamically allocated memory as an instance of the structure having the field type at block 409. If the field within the structure does not "appear correct," the memory debug module can assign the block of dynamically allocated memory to 'unknown' at block 411.

Figure 5:
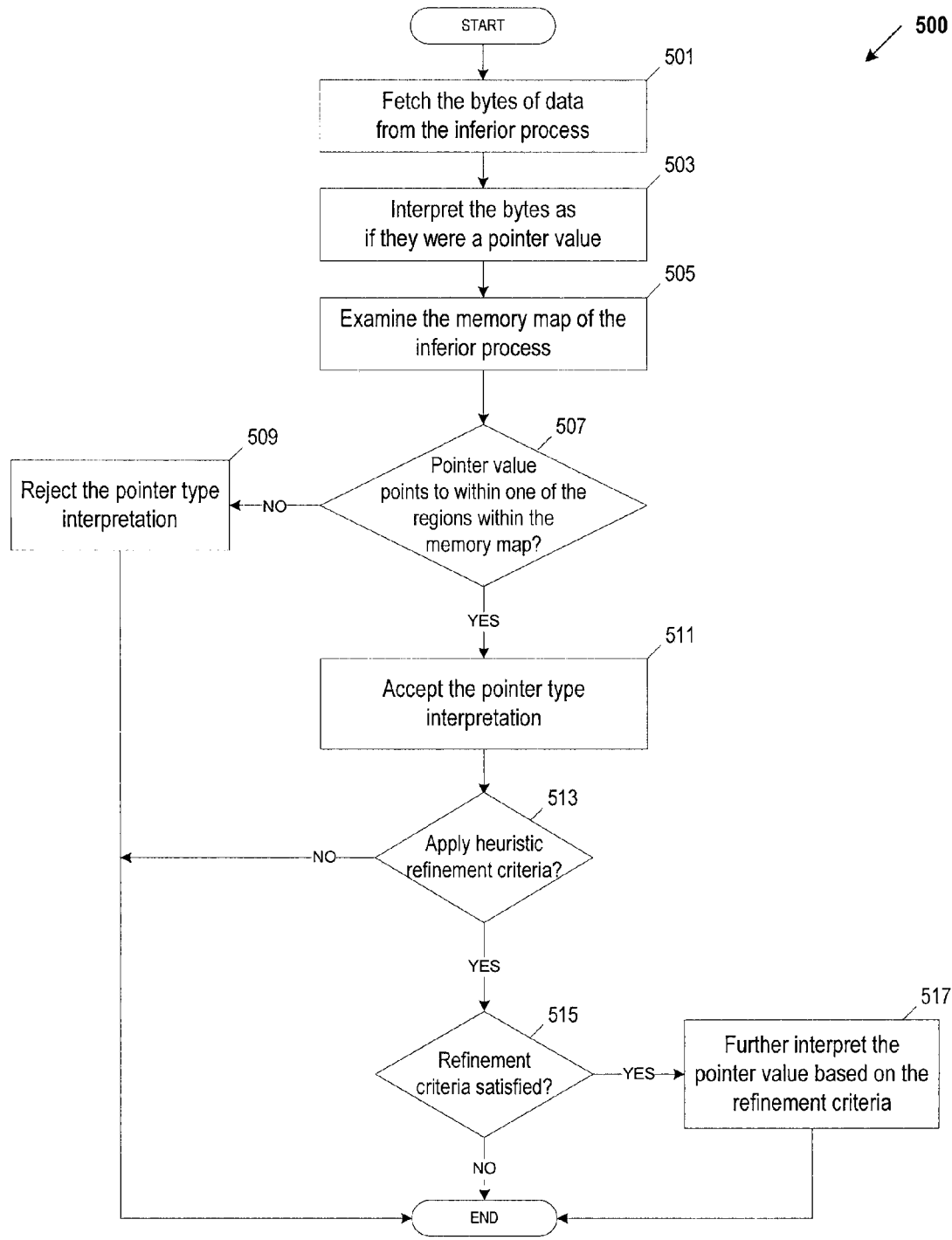
FIG. 5 is a flow diagram of an embodiment of a method for interpreting bytes as a pointer value to categorize the dynamically allocated areas of memory.

FIG. 5 is a flow diagram of an embodiment of a method 500 for determining whether a field having a pointer type appears correct. Method 500 can be performed by processing logic that can comprise hardware (e.g., circuitry, dedicated logic, programmable logic, microcode, etc.), software (e.g., instructions run on a processing device), or a combination thereof. In one embodiment, method 500 is performed by the memory debug module 140 in the programming and debugging system 100 of FIG. 1.

In one embodiment, the method 500 starts with the memory debug module casting a block of dynamically allocated memory as an instance of a structure and determining the field type of a field in the instance of the structure is a pointer type. At block 501, the memory debug module fetches bytes of data from the inferior process and interprets the bytes as if they were a pointer value at block 503.

At block 505, the memory debug module examines a memory map of the inferior process and determines whether the bytes that are interpreted as a pointer value points to within one of the regions within the memory map at block 507. A memory map subdivides the set of all possible values, which the bytes of dynamically allocated memory can take, into a set of valid regions (e.g., code and data within each of the shared libraries making up the inferior process; regions used for dynamic allocation, stack regions, etc). If the pointer value does not point to within one of the regions within the memory map (block 507), the memory debug module rejects the pointer type interpretation at block 509. In one embodiment, the memory debug module assigns a field type of 'unknown' to the field when the pointer value is rejected.

If the pointer value points to within one of the regions within the memory map (block 507), the memory debug module accepts the pointer type interpretation and assigns the pointer type to the field at block 511. For example, a computing system has a 32 bit CPU. The memory debug module analyzes a 4 byte value of the dynamically allocated memory to determine whether the 4 byte value is a pointer or not. The memory debug module interprets the 4 byte value as a pointer, such as a little endian (void*) pointer in the C programming language. The memory map of the inferior process includes an overall addressable 4 GB of address space, and indicates which subranges within the address spare are actually valid. The memory debug module examines memory map and determines that the interpretation of the 4 byte value as a little endian (void*) pointer is a valid subrange within the 4 GB address space. The memory debug module assigns the little endian (void*) pointer type to the field At block 513, the memory debug module determines whether to further refine the pointer type interpretation by applying heuristic refinement criteria. The memory debug module searches the heuristics data for refinement criteria that corresponds to the pointer interpretation. If the heuristics data does not include refinement criteria, the memory debug module does not further refine the pointer type interpretation and the method ends. If the heuristics data includes refinement criteria, the memory debug module determines whether the refinement criteria is satisfied at block 515. If the refinement criteria is not satisfied, the memory debug module does not further refine the pointer type interpretation and the method ends. If the refinement criteria is satisfied, the memory debug module further interprets the bytes based on the refinement criteria at block 517.

For example, in one refinement, the memory debug module detects and accepts an "all zeros" value as being a valid pointer (the "NULL" value) and assigns a "NULL" value to the field at block 517. In another example of a refinement, the memory debug module determines whether a pointer value address is a multiple of a value and rejects pointer values that are not a multiple of some value. In one embodiment, the value is 4. Typical pointer values are aligned to a 4-byte boundary. For example, the memory debug module is analyzing 4 bytes of memory in a 32 bit operating system to determine whether the value in these 4 bytes of memory contain a pointer value or not. The memory debug module fetches the 4 bytes and examines the two least significant bits to determine whether they are a multiple of 4.

In another example of a refinement, for a particular programming language, the memory debug module determines whether a pointer value points to an appropriate region type and rejects pointer values that do not point to an appropriate region type. For example, the appropriate region type for a particular field that is a C function pointer is a region of machine code, rather than a region of data. In another example, the appropriate region for a particular field that is a pointer to dynamically-allocated data, is a region of dynamic memory allocations.

In another example of a refinement, the memory pointed to by the pointer value can be subjected to further tests. For example, for Python objects, the memory debug module can first determine whether a field that is a "ob_type" pointer appears to be a valid pointer, and then examine the referenced memory to determine if it satisfies criteria for being a PyTypeObject. If the criteria is not satisfied, the memory debug module can reject the interpretation of the block of memory as a PyObject.

Figure 6:
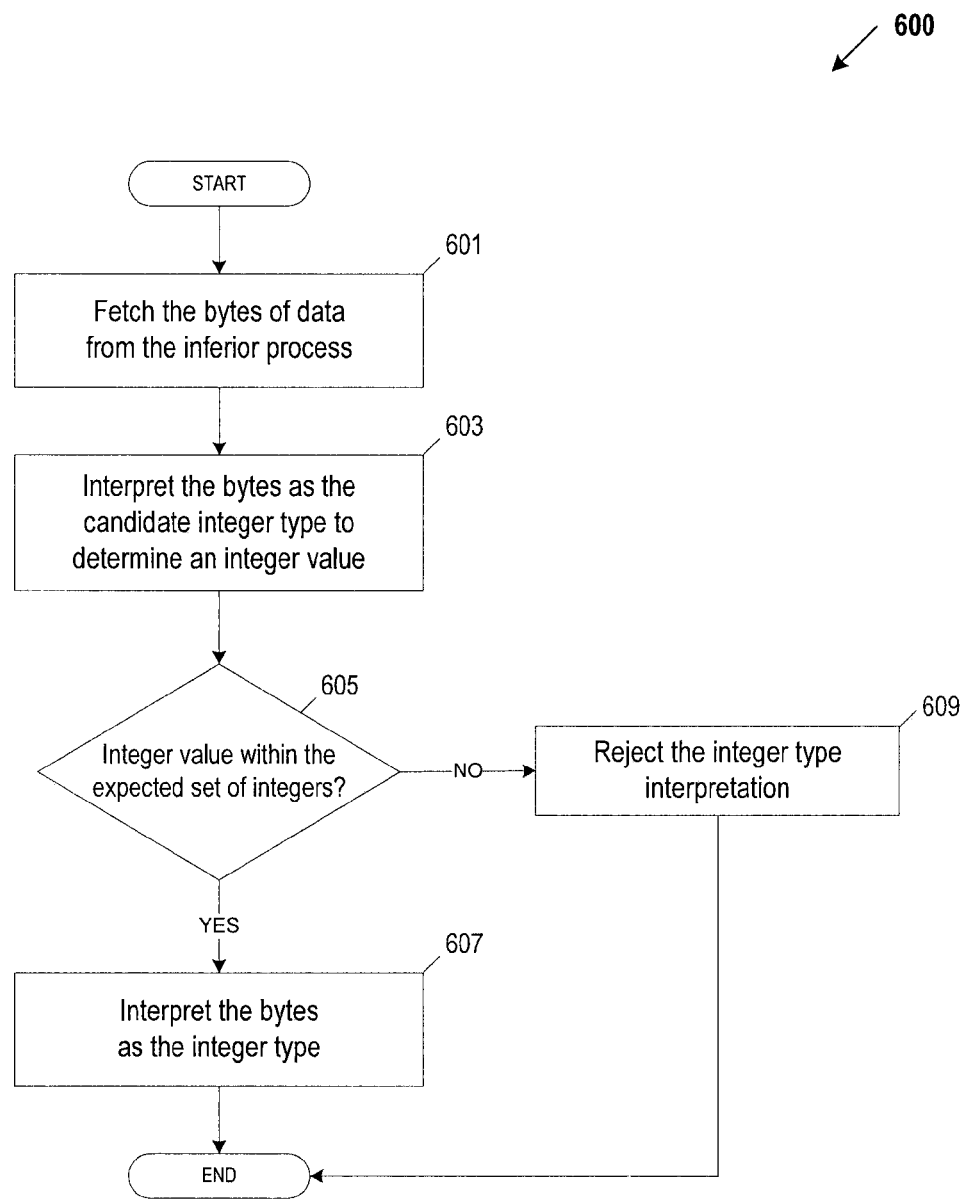
FIG. 6 is a flow diagram of an embodiment of a method for interpreting bytes as a candidate integer to categorize the dynamically allocated areas of memory.

FIG. 6 is a flow diagram of an embodiment of a method 600 for determining whether a field having an integer type appears correct. Method 600 can be performed by processing logic that can comprise hardware (e.g., circuitry, dedicated logic, programmable logic, microcode, etc.), software (e.g., instructions run on a processing device), or a combination thereof. In one embodiment, method 600 is performed by the memory debug module 140 in the programming and debugging system 100 of FIG. 1.

In one embodiment, the method 600 starts with the memory debug module casting a block of memory as an instance of a structure and determining the field type of a field in the instance of the structure is an integer type. At block 601, the memory debug module fetches bytes of data from the inferior process and interprets the bytes as the candidate integer type to determine an integer value at block 603. At block 605, the memory debug module determines whether the value of the interpreted bytes is within a set of integers that corresponds to the values that are associated with the candidate integer type. For example, on a 32-bit architecture, a particular structure may use 4 bytes to represent a field. The field may only use small positive integers. The memory debug module can determine whether the 4 bytes represent an integer by reading the bytes from the inferior process, interpreting them as the candidate integer type to determine an integer value, and then check if the resulting value is within the expected range. Other examples of sets of integers that correspond to the values that are associated with candidate integer types can include, and are not limited to, a range from 1 to 65536, an even number between 256 and 512, a range of 0-255, etc.

If the value is within the set of expected integers (block 605), the memory debug module interprets the bytes as the integer type at block 607. If the value does not represent an integer within the set of integers (block 605), the memory debug module rejects the integer type interpretation at block 609. In one embodiment, the memory debug module assigns the block of dynamically allocated memory to 'unknown'.

For example, the heuristics data for Python objects can include criteria that a field that is a "ob_refcnt" field has an integer value in the range 0-0xFFFF, given that this range is the typical range observed for a 32-bit field for many objects. At block 605, the memory debug module can check whether the field that would be "ob_refcnt" is in the range 0-0xFFFF.

In another example, the heuristics data for Python objects can include criteria that a field that is a "ob_size" field, which may or may not be a PyTypeObject, does not have an integer value that is greater than 0xFFFF, given that real-world examples of such objects generally have much smaller values than that, despite using at least 32-bits to represent that field. At block 605, the memory debug module can reject an integer value interpretation for any integer values that are greater than 0xFFFF.

Figure 7:
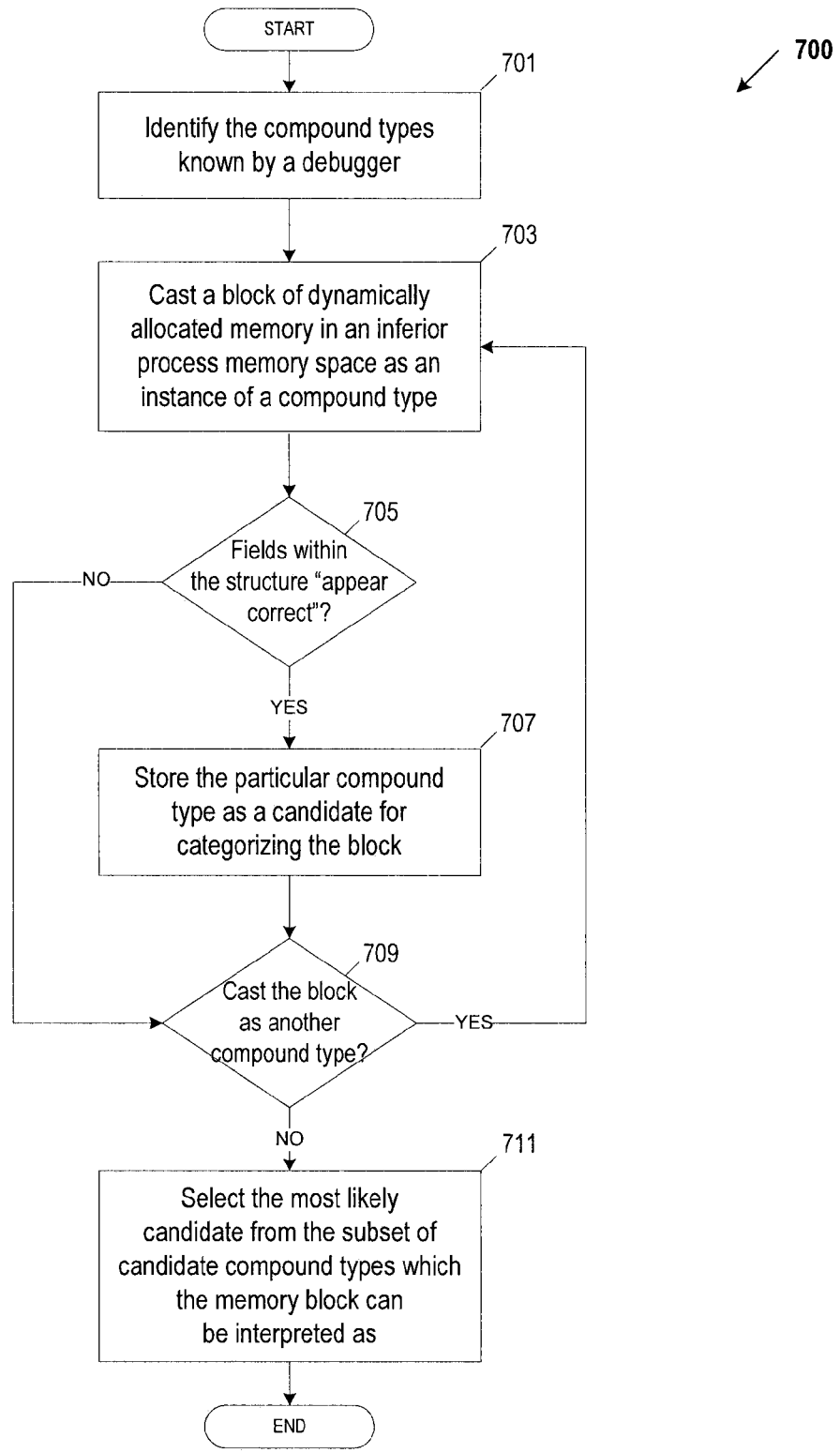
FIG. 7 is a flow diagram of an embodiment of a method for determining whether a field appears correct using compound types known by a debugger tool.

FIG. 7 is a flow diagram of an embodiment of a method 700 for determining whether a field appears correct using compound types known by a debugger tool. Method 700 can be performed by processing logic that can comprise hardware (e.g., circuitry, dedicated logic, programmable logic, microcode, etc.), software (e.g., instructions run on a processing device), or a combination thereof. In one embodiment, method 700 is performed by the memory debug module 140 in the programming and debugging system 100 of FIG. 1.

In one embodiment, the method 700 starts with the memory debug module identifying the compound types known by a debugger tool at block 701. The memory debug module can iterate through all of the debug metadata to identify which compound types are potentially within the inferior process. At block 703, the memory debug module casts a block of memory as an instance of a compound type and interprets the fields to determine whether the fields "appear correct" at block 705.

If the field appears correct, the memory debug module can store the particular compound type as a candidate for categorizing the block at block 707. If the field does not appear correct (block 705), the memory debug module can determine whether to cast the block as another compound type at block 709. If there is another compound type, the memory debug module can return to block 703 to cast the block of memory to another compound type that is known by the debugger tool and interpret the field at block 705. If there is not another compound type (block 709), the memory debug module can select the most likely candidate from the subset of candidate compound types to categorize the block at block 711. In one embodiment, the memory debug module can sort the candidate compound types in descending order by size in memory and select the largest one that matches all of the field-filtering criteria. Method 700 can be a recursive method, such that the memory debug module can continue to iterate through other blocks of dynamically allocated memory and cast the blocks as each compound type to categorize each block.

Figure 8:
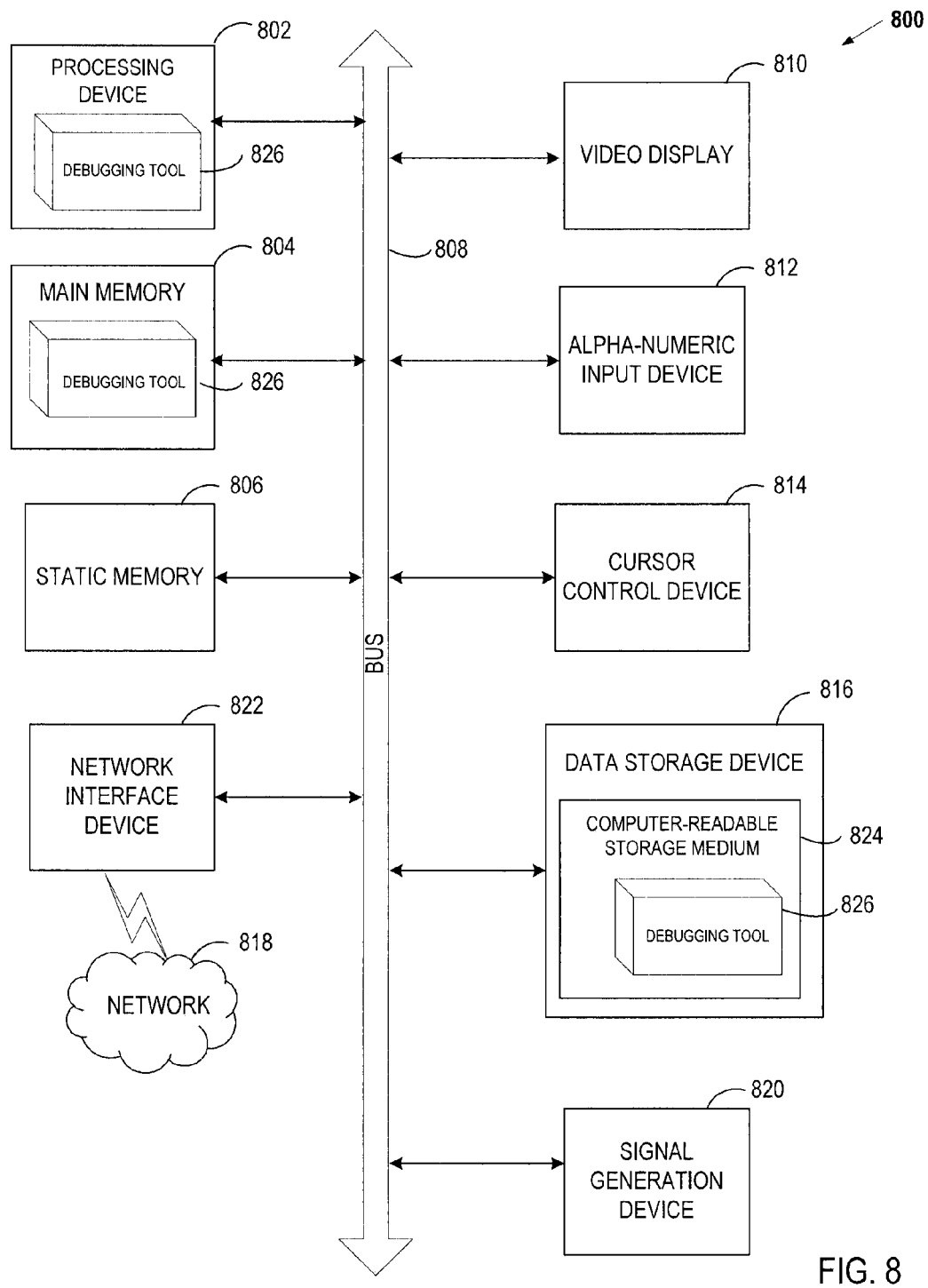
FIG. 8 is a diagram of one embodiment of a computer system for debugging a dynamic memory allocation using heuristics for field types of a structure.

FIG. 8 is a diagram of one embodiment of a computer system for debugging a dynamic memory allocation using heuristics reliability scores. Within the computer system 800 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM) or DRAM (RDRAM), etc.), a static memory 806 (e.g., flash memory, static random access memory (SRAM), etc.), and a secondary memory 816 (e.g., a data storage device in the form of a drive unit, which may include fixed or removable computer-readable storage medium), which communicate with each other via a bus 808.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. Processing device 802 is configured to execute the debugging tool 826 for performing the operations and steps discussed herein.

The computer system 800 may further include a network interface device 822. The computer system 800 also may include a video display unit 810 (e.g., a liquid crystal display (LCD) or a cathode ray tube (CRT)) connected to the computer system through a graphics port and graphics chipset, an alphanumeric input device 812 (e.g., a keyboard), a cursor control device 814 (e.g., a mouse), and a signal generation device 820 (e.g., a speaker).

The secondary memory 816 may include a machine-readable storage medium (or more specifically a computer-readable storage medium) 824 on which is stored one or more sets of instructions (e.g., the debugging tool 826) embodying any one or more of the methodologies or functions described herein. The debugging tool 826 may also reside, completely or at least partially, within the main memory 804 and/or within the processing device 802 during execution thereof by the computer system 800, the main memory 804 and the processing device 802 also constituting machine-readable storage media. The debugging tool 826 may further be transmitted or received over a network 818 via the network interface device 822.

The computer-readable storage medium 824 may also be used to store the debugging tool 826 persistently. While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The debugging tool 826, components and other features described herein (for example in relation to FIG. 2) can be implemented as discrete hardware components or integrated in the functionality of hardware components such as ASICS, FPGAs, DSPs or similar devices. In addition, the debugging tool 826 can be implemented as firmware or functional circuitry within hardware devices. Further, the debugging tool 826 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "casting," "categorizing," "identifying," "fetching," "interpreting," "assigning," "detecting," "reading," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for debugging a dynamic memory allocation using heuristics reliability scores is described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   determining, by a processing device, that a block of dynamically allocated memory in an inferior process memory space corresponds to a structure;
   casting the block of memory as an instance of the structure;
   determining a field type of a field in the instance of the structure;
   determining heuristics data that corresponds to the field type;
   determining whether memory data pertaining to the block of dynamically allocated memory satisfies one or more criteria in the heuristics data that corresponds to the field type; and
   categorizing the block of dynamically allocated memory based on the determination of whether the memory data satisfies the one or more criteria of the field type.

2. The method of claim 1, wherein determining that the block of dynamically allocated memory corresponds to a structure comprises:
   determining that a size of the block of dynamically allocated memory corresponds to a structure based on heuristics data comprising one or more criteria for categorizing the dynamically allocated area of memory.

3. The method of claim 1, wherein determining that the block of dynamically allocated memory corresponds to a structure comprises:
   determining that a size of a first location of an area of dynamically allocated memory fails to correspond to a structure;
   identifying at least a second location of an area of dynamically allocated memory, the at least second location being offset a number of bytes from the first location; and
   determining whether a size of the at least second location corresponds to a structure.

4. The method of claim 1, wherein determining the field type of a field in the instance of the structure comprises:
   fetching bytes of data from the block of dynamically allocated memory of an inferior process;
   interpreting the bytes as a pointer value;
   determining whether the pointer value points to a region within a memory map of the inferior process; and
   assigning a pointer type to the field based on a determination that the pointer value points to a region within a memory map of the inferior process and assigning a field type of unknown to the field based on a determination that the pointer value fails to point to a region within the memory map.

5. The method of claim 4, further comprising:
   detecting an all zeros value in the field; and
   assigning a NULL value to the field.

6. The method of claim 4, further comprising:
   determining a base value;
   determining whether the pointer value is a multiple of the base value; and
   assigning a field type of unknown to the field based on a determination that the pointer value is not a multiple of the base value.

7. The method of claim 4, further comprising:
   determining whether the pointer value points to an appropriate region type; and
   assigning a field type of unknown to the field based on a determination that the pointer value fails to point to an appropriate region type.

8. The method of claim 1, wherein determining the field type of a field in the instance of the structure comprises:
   reading bytes of data from the block of dynamically allocated memory of an inferior process;
   interpreting the bytes as a candidate integer type;
   determining whether a value of the interpreted bytes is within a set of integers that corresponds to values associated with the candidate integer type; and assigning the integer type to the field based on a determination that the value is within the set of integers and assigning a field type of unknown to the field based on a determination that the value fails to represent an integer within the set of integers.

9. A system comprising:
a memory; and
a processing device coupled to the memory to
   determine that a block of dynamically allocated memory in an inferior process memory space corresponds to a structure;
   cast the block of memory as an instance of the structure;
   determine a field type of a field in the instance of the structure;
   determine heuristics data that corresponds to the field type;
   determine whether memory data pertaining to the block of dynamically allocated memory satisfies one or more criteria in the heuristics data that corresponds to the field type; and
   categorize the block of dynamically allocated memory based on the determination of whether the memory data satisfies the one or more criteria of the field type.

10. The system of claim 9, wherein the processing device is to determine that the block of dynamically allocated memory corresponds to a structure by:
   determining that a size of the block of dynamically allocated memory corresponds to a structure based on heuristics data comprising one or more criteria for categorizing the dynamically allocated area of memory.

11. The system of claim 9, wherein the processing device is to determine that the block of dynamically allocated memory corresponds to a structure by:
   determining that a size of a first location of an area of dynamically allocated memory fails to correspond to a structure;
   identifying at least a second location of an area of dynamically allocated memory, the at least second location being offset a number of bytes from the first location; and
   determining whether a size of the at least second location corresponds to a structure.

12. The system of claim 9, wherein the processing device is to determine the field type of a field in the instance of the structure by:
   fetching bytes of data from the block of dynamically allocated memory of an inferior process;
   interpreting the bytes as a pointer value;
   determining whether the pointer value points to a region within a memory map of the inferior process; and
   assigning a pointer type to the field based on a determination that the pointer value points to a region within a memory map of the inferior process and assigning a field type of unknown to the field based on a determination that the pointer value fails to point to a region within the memory map.

13. The system of claim 12, wherein the processing device is further to:
   determine a base value;
   determine whether the pointer value is a multiple of the base value; and
   assign a field type of unknown to the field based on a determination that the pointer value is not a multiple of the base value.

14. The system of claim 9, wherein the processing device is to determine the field type of a field in the instance of the structure by:
   reading bytes of data from the block of dynamically allocated memory of an inferior process;
   interpreting the bytes as a candidate integer type;
   determining whether a value of the interpreted bytes is within a set of integers that corresponds to values associated with the candidate integer type; and
   assigning the integer type to the field based on a determination that the value is within the set of integers and assign a field type of unknown to the field based on a determination that the value fails to represent an integer within the set of integers.

15. A non-transitory computer-readable storage medium including instructions that, when executed by a processing device, cause the processing device to perform a set of operations comprising:
   determining that a block of dynamically allocated memory in an inferior process memory space corresponds to a structure;
   casting the block of memory as an instance of the structure;
   determining a field type of a field in the instance of the structure;
   determining, by the processing device, heuristics data that corresponds to the field type;
   determining whether memory data pertaining to the block of dynamically allocated memory satisfies one or more criteria in the heuristics data that corresponds to the field type; and
   categorizing the block of dynamically allocated memory based on the determination of whether the memory data satisfies the one or more criteria of the field type.

16. The non-transitory computer-readable storage medium of claim 15, wherein determining that the block of dynamically allocated memory corresponds to a structure comprises:
   determining that a size of the block of dynamically allocated memory corresponds to a structure based on heuristics data comprising one or more criteria for categorizing the dynamically allocated area of memory.

17. The non-transitory computer-readable storage medium of claim 15, wherein determining that the block of dynamically allocated memory corresponds to a structure comprises:
   determining that a size of a first location of an area of dynamically allocated memory fails to correspond to a structure;
   identifying at least a second location of an area of dynamically allocated memory, the at least second location being offset a number of bytes from the first location; and
   determining whether a size of the at least second location corresponds to a structure.

18. The non-transitory computer-readable storage medium of claim 15, wherein determining the field type of a field in the instance of the structure comprises:
   fetching bytes of data from the block of dynamically allocated memory of an inferior process;
   interpreting the bytes as a pointer value;
   determining whether the pointer value points to a region within a memory map of the inferior process; and
   assigning a pointer type to the field based on a determination that the pointer value points to a region within a memory map of the inferior process and assigning a field type of unknown to the field based on a determination that the pointer value fails to point to a region within the memory map.

19. The non-transitory computer-readable storage medium of claim 18, further comprising:
   determining a base value;

determining whether the pointer value is a multiple of the base value; and assigning a field type of unknown to the field based on a determination that the pointer value is not a multiple of the base value.

20. The non-transitory computer-readable storage medium of claim 18, wherein determining the field type of a field in the instance of the structure comprises:

reading bytes of data from the block of dynamically allocated memory of an inferior process;

interpreting the bytes as a candidate integer type;

determining whether a value of the interpreted bytes is within a set of integers that corresponds to values associated with the candidate integer type; and assigning the integer type to the field based on a determination that the value is within the set of integers and assigning a field type of unknown to the field based on a determination that the value fails to represent an integer within the set of integers.

* * * * *